United States Patent [19]

Inoue

[11] Patent Number: 5,422,391
[45] Date of Patent: Jun. 6, 1995

[54] HIGH DENSITY ARTIFICIAL STONE AND A METHOD FOR PRODUCING THEREFOR

[75] Inventor: Yukihiko Inoue, Kanagawa, Japan

[73] Assignee: Doppel Co., Ltd., Tokyo, Japan

[21] Appl. No.: 155,286

[22] Filed: Nov. 22, 1993

[30] Foreign Application Priority Data

Nov. 20, 1992 [JP] Japan .................................. 4-312335
Nov. 20, 1992 [JP] Japan .................................. 4-312337

[51] Int. Cl.⁶ .......................... C08K 3/40; C08K 3/26; C08K 3/22
[52] U.S. Cl. .................... 524/427; 428/147; 523/220; 524/440; 524/443; 524/444; 524/457; 524/494; 524/437
[58] Field of Search ............... 523/221, 220; 524/440, 524/443, 444, 457, 513, 427, 514, 437, 494; 428/147, 149, 150

[56] References Cited

U.S. PATENT DOCUMENTS 3,663,493  5/1972  Miller .................................. 523/220
3,714,113  1/1973  Kingston ........................... 523/220
4,085,246  4/1978  Buser et al. ....................... 524/437

FOREIGN PATENT DOCUMENTS 59-111969  6/1984  Japan .

*Primary Examiner*—Veronica P. Hoke
*Attorney, Agent, or Firm*—Wenderoth, Lind & Ponack

[57] ABSTRACT

The present invention provides high density artificial stone with physical properties similar to those of natural stone and having excellent and beautiful external appearance as well as a method to produce same.

More particularly, the present invention provides high density artificial stone consisting of 10 to 70 mesh inorganic fine particles from natural stone and the like which are mixed with 100 mesh or above inorganic very fine particles to the weight ratio ranging from 0.5:1 to 5:1, jointly accounting for at least 85% of the weight of the final product, containing 15% or less resins, wherein each raw material component is uniformly distributed and the fine particles from natural stone and the like are exposed on the surface of the product.

32 Claims, No Drawings

HIGH DENSITY ARTIFICIAL STONE AND A METHOD FOR PRODUCING THEREFOR

FIELD OF THE INVENTION

The present invention relates to a high density artificial stone and a method for producing. More particularly, the present invention relates to a high density artificial stone having an excellent marble-like surface and a method for producing therefor and provides artificial stone which is useful as a wall, floor and other building material, construction material, stone pillar and the like.

PRIOR ART

It is well known to crush natural stone into a suitable size, mix the resultant particles with calcium carbonate and resins, and harden the resultant mixture to produce an artificial stone. More particularly, according to a method revealed, for example, in the publication of unexamined patent application No. 101443-1986 (JP-A-101443/86), block-like artificial stone which resists cutting is produced and, further, raw material stone powder, resins and the like are mixed at a reduced pressure, input into a mold, and picked for cutting or otherwise processing.

According to the publication of examined patent application No. 24447-1978 (JP-B-24447/78), raw materials of a specified mixing ratio are used to produce an artificial stone using natural stone particles and synthetic resins wherein the inventor emphasized the necessity of a sufficient processing after inputting raw materials into a mold.

As indicated in these known examples, these methods have a problem as for the artificial stone produced by these methods that air bubbles are left in the molded product because a molding box is used, and that fluidity must be secured to allow the resins and stone particles to flow into the mold.

To prevent air bubbles, a method revealed in the publication of examined patent application No. 24447-1978 (JP-B-24447/78) above-mentioned, for example, secures fluidity by increasing the quantity of resins to be used.

However, increasing the quantity of resins to prevent air bubbles and secure fluidity to facilitate feed of materials into the mold may facilitate security of fluidity and prevention of air bubbles, but adversely affects the physical properties of the artificial stone produced.

This means that the use of a large quantity of resins directly results in the production of resinous product. The resultant product is simply a resin product with sporadic occurrence of natural stone particles therein. In terms of physical properties, the product is more similar to resins (used as raw material) than to stone (used as raw material). The product might be called artificial stone, but is actually a resin product which simply looks like stone.

When materials are pressurized in a completely sealed mold in the known method, the resultant air bubbles are simply pressed, and can not essentially escape, with the result that they partly remain on the surface of or inside the product to impair the appearance of the end product and deteriorate its physical properties.

Researchers are actively studying, therefore, on the possible composition of a new artificial stone and a method to produce same to solve the above problems related to the conventional artificial stone. More particularly, they are actively studying a method whereby when particles of natural stone and the like are used as raw materials, the resultant product will have a high density and physical properties similar to those of natural stone, that is, the resultant product will have the state and physical properties of stone in terms of not only appearance but also quality, and further, the resultant artificial stone may have a board, bar or any other arbitrary form through security of the desired physical properties.

So far, no such artificial stone has ever been put into practical use. This is because a major problem is remained about not only the composition of raw materials but also, in relation to it, processing method for the surface properties of the final product. More particularly, whereas even in the case of natural stone, its surface is roughened in order to improve sense of mass, provision of the roughened surface impairs the sense of mass in the case of artificial stone which is made of resins in part.

More specifically, to roughen the surface of natural stone, the jet burner method is used to peel the surface using the different thermal expansion rates of ores, or the tapping method is used, but not limited to these, wherein the surface is physically destroyed by hitting the surface with steel balls or by the impact of a chisel. The latter is generally used to cement-base artificial stone (terrazzo).

However, the jet burner method can not be used for resin-base (acrylic, unsaturated polyester, etc.) artificial stone. When the tapping method is applied to this type of artificial stone, the cracked surface blushes and the coloring itself is rendered invalid even when pigment or the like is mixed for coloring in the resins or colored aggregates are used instead. This is a major drawback of the conventional methods. For this reason, it is so far impossible to produce resin-base artificial stone with uneven surface having fine grain and sense of mass while featuring excellent quality similar to that of marble.

According to another conventional method, a molding box with an uneven surface pattern is used to therein cast or input a mixture of resins, aggregates and fillers in order to allow it to harden to eventually make a product. In this method, the surface is wholly covered with a resin film, and the eventual product is none other than a resin product in terms of wear resistance, design, etc.

Further, conventional artificial stone not only has a critical problem with respect to its composition but also is restricted in terms of its formation itself due to the use of a mold. It is impossible to produce an artificial stone of an arbitrary shape with excellent sense of mass.

Researchers are actively studying on the composition of an improved artificial stone and a production method thereof to solve the above defects of the conventional artificial stone. More particularly, they are actively studying a method whereby when particles of natural stone and the like are used as raw materials, the resultant product will have a high density and physical properties similar to those of natural stone, that is, the resultant product will have the state and nature of stone in terms of not only appearance but also quality, and further, the resultant artificial stone may have a board, bar or any other arbitrary form through security of nature in terms of physical properties.

SUMMARY OF THE INVENTION

The present invention has been made in view of the above circumstances, and provides new artificial stone, high density cylindrical artificial stone in particular, which gives the sense of mass of natural stone, uses inexpensive stone chips, recovered fine particles or other inorganic raw materials, and facilitate production of the artificial stone which are useful as pillars, board, etc. in a building and the like.

The present invention has been made to solve the above problems. It provides high density artificial stone made of 10 to 70 mesh inorganic fine particles and 100 mesh or above inorganic very fine particles mixed to a ratio ranging from 0.5:1 to 5:1 by weight, jointly accounting for at least 85 wt % of the final product, wherein resins are included together with, where necessary, glass fiber, and wherein the fine particles are exposed on the surface.

The present invention further provides a method to produce high density artificial stone which is made of 10 to 70 mesh inorganic fine particles and 100 mesh or above inorganic very fine particles mixed to a ratio ranging from 0.5:1 to 5:1 by weight, jointly accounting for at least 85 wt % of the final product, wherein resins are included together with, where necessary, glass fiber, the above resultant mixture being input into a forming mold for molding, and the resins on the surface removed either by softening or melting using an organic solvent, or mechanically, or by means of water jet applied to the surface of the product to allow fine particles to be exposed on the surface.

The present invention further provides high density cylindrical artificial stone which is formed and solidifies into a cylindrical form having a polished or roughened surface, high density cylindrical artificial stone which integrally solidifies with a cylindrical concrete molded product, and a centrifugal production method therefor.

DETAILED DESCRIPTION OF THE INVENTION

The present invention is described in more detail below.

Raw materials for the production of artificial stone according to the present invention are largely classified into three types. The major component is 10 to 70 mesh fine particles which are appropriately selected from natural stone, ceramics, glass, metal or other fine particles. A part of these fine particles may be chips of these materials.

The second component, 100 mesh and above very fine particles, is used together with the above fine particles. They can be various natural or artificial very fine particles. Calcium carbonate, aluminum oxide and the like are some of the easily available very fine particles.

The last third component is resins. The resins to be used in the present invention can be selected from a wide range of thermosetting resins.

Some examples include acrylic or methacrylic resins, preferably PMMAC (poly-methylmethacrylate), unsaturated polyester resins, etc.

Fine particles of natural stone and the like are an important factor for determining the appearance and physical properties of the artificial stone which is produced. They are, in particular, a major factor for determining surface color and pattern, together with other components, through local exposure.

Very fine particles are well above the 100 mesh level, and are considerably finer than fine particles. They go through fine particles and stay there to fill the space between particles, thereby contributing to the establishment of properties of the artificial stone to be produced such as hardness and pliancy. The ratio of fine and very fine particles if preferably 0.5:1 to 5:1 by weight.

The resins wrap fine particles of natural stone and the like and very fine particles forming the above skeletal structure, and bind all the components to an entirety, giving resiliency or tensile strength to the end product when the artificial stone is finally produced.

Structural ratio of these components is important in the present invention. The structural ratio of resins to other components, in particular, is the most important. High density means that fine and very fine particles are present in the product in a high density. The level of presence is well above the range which is normal in conventional artificial stone, or is above 2 g/cm$^3$, for example.

The higher the structural ratio for the fine particles of natural stone and the like in the product which are the fundamental essentially needed component, the closer the product is to natural stone. If the quantity of fine particles is too much, however, the material will not solidify, and the end product is not suitable for practical use. The resultant product will have poor physical properties, and is not suitable for use in an ordinary method.

Use of too much fine particles not only prohibits solidification but also produces a product of poor lust, which is hardly called stone.

Accordingly, the ratio of fine and very fine particles has a certain limit. More specifically, the ratio by weight must be at least 85%, preferably at least 90%. The product is brittle and is difficult to use when the ratio exceeds 98%. If the ratio is less than 85%, the end product is too soft, and has a poor property as stone. The application range is also almost as narrow as that for resin boards.

This means that the substance other than fine particles of natural stone and the like and very fine particles, namely resins, should not exceed 15% by weight in the end product.

If the resins content exceeds about 15%, the end product is resinous and does not quality as artificial stone although the appearance may look like stone. If the resins content is too low, on the other hand, the property as stone may be improved but the product is brittle, and is not suitable for practical use. In reality, it was difficult to decrease the resins content down to 10% or less.

Fine particles should be of the size 10 to 70 mesh but preferably, only the same particles size should be used except in a special case. For example, one might think to use both colored and colorless particles so that the color would be rich in the upper or lower area, which could be achieved by changing the size of the particles to be used according to the presence or lack of color, but the use of a large quantity of particles of an extremely different particles size should be avoided because the strength of the product is adversely affected.

Particle size of very fine particles should be small enough for the particles to go between fine particles as mentioned before. Accordingly, a size close to that of fine particles is not preferably, but 150 to 250 mesh is recommended.

It is important in the high density artificial stone according to the present invention that, except for a special case, the constituent materials are uniformly distributed throughout the product.

Glass fiber may additionally be used depending on the shape of the artificial stone after molding and the type of application. For example, mixing of glass fiber is effective for producing products with a curved surface, products of a miscellaneous shape, and the products which are used in a place calling for a high mechanical strength is required. Mixing rate for glass fiber is generally about 1 to 15 wt % of inorganic fine particles. When 15 wt % is exceeded, the presence of glass fiber impairs the sense of mass of the resultant artificial stone, which should be avoided. The mixing rate should preferably be 3 to 8%.

Glass fiber in general use is 10 to 100 $\mu$m in diameter and about 1 to 5 mm in length.

Resin deterioration preventive agent, flame retarder, hardener, auxiliary hardener, viscosity improver, pigment and the like may be added in the present invention to the extent that the features are not lost.

The surface constituting the exterior of the product may be polished or roughened. More specifically, it is preferable that at least a part of the surface consists of exposed fine particles to give the color tone of beautiful natural stone. In addition, the surface may preferably be polished or roughened depending on application.

Polishing is a practical and convenient method to expose fine grain of the high density artificial stone. It is also possible to partly polish the surface of a product to expose fine particles and use the difference with the other part of the same surface as a pattern.

Determining the target natural stone before starting production of artificial stone is important. Marble is frequently a target stone because it occurs only rarely in nature and its color and lust are beautiful. In this instance, the color and lust are an important theme deciding the value of marble. Natural marble varies in color from black to white or red, and even if the color is the same, the level of color can be quite different.

To reproduce these diverse colors, for example to produce black artificial stone, one may use only the black particles obtained from black natural marble, but it is very difficult to reproduce a halftone color. Even though the color may be reproduced in one way or another, a considerable amount of efforts are required, or sometimes it was difficult, to reproduce the lust unique to marble.

It was particularly difficult to reproduce lust when dyes or pigments were used to reproduce the color.

In the present invention, on the other hand, crushed natural quarts stone is used as fine particles to reproduce the lust of marble, etc.

Fine particles consisting of crushed natural quarts stone have a uniquely smooth surface because the raw material is quarts-base material. They are further colorless and transparent in most cases. They may have color in rare cases, which, however, is not rich. Even when they are opaque, they normally retain some transparency.

By using raw materials selectively in this way, the color of the end product can be mostly determined by the color of resins to be used. In addition, the color thus obtained has some lust because of the presence of quarts-base fine particles.

When unsaturated polyester resins are used, for example, the color of the resins is normally yellowish white, and thus the color of the end product is lustrous milky white looking like natural marble.

It is also possible to color the product using pigments and the like mixed in the resins provided quarts-base fine particles are used. The color is uniform, and the end product has a unique color tone.

To color the end products, crushed natural quarts stone is used as it is without processing in terms of color, or it is also possible to add coloring agent of substantially the same size as fine particles.

End products of a desired color tone can be produced by mixing fine quarts particles which are not processed in terms of color with colored particles at a certain given ratio. Color reproduction by this method is by far easier than the conventional method where resins are colored or pigments and the like is used. The product made according to this method will not discolor, and the lust is reproduced accurately. For these reasons, the end products are superior to those manufactured by a conventional coloring method.

When reproducing a special color by mixing several differently colored particles, the color can be adjusted very easily by adding quarts particles which are not processed in terms of color.

It is a good idea to use natural colored particles but the availability is limited in terms of both quantity and color.

It is effective to coat natural particles with glaze used for coloring ceramics and the like, and bake them to realize the desired color. The color can be defined clearly and a wide range of colors are available for selection.

Black and red can be perfectly reproduced when the same fine quarts particles that are used as the fine particles for the product are selected and coated with glaze and baked. In this case, not only color but also lust and tone are perfectly reproduced, and the effect is never obtainable with an conventional coloring method.

High density artificial stone with such excellent color tone properties produced according to the present invention may have an arbitrary shape including the panel, bar and cylindrical form.

Various different molding methods are available for selection, for example, casting and compression molding.

It is important with the production method according to the present invention to use a mold which is not closed. In other words, the open area must clearly be a part of the entire surface area.

For example, to produce a rectangular pillar, a mold whose internal boards are provided with open edges should preferably be used, with the open side located above all other sides.

The opening may be located not necessarily at the upper side but may be located at the narrow side, as an alternative, as a half-opening, by using a net, for example, so that the fine particles will not easily escape therefrom.

The size of the opening may only be a few percent of the total external surface of the internal volume of the mold used.

For this type of mold, it is necessary to decrease the internal volume of the mold after pouring a uniform mixture of resins, fine particles and very fine particles while it is still fluid.

If the internal part of the mold is made up of flat panels, for example, the flat panel area of the mold is brought closer to decrease the thickness. As the internal volume decreases, the resins are pushed out, and collect in the open area of the mold, eventually overflowing therefrom. As an alternative, the bottom moves up, after casting, to diminish the internal volume, so that the resins overflow.

Fine and very fine particles have apparently a greater specific gravity than resins, so that they sink to the bottom when cast into a mold. The sinking takes place rapidly because of the great difference between their respective specific gravities. When the internal volume decreases, the resins, most of which are light, are pushed out, and collect in the open area. If the internal volume is specified beforehand and the volume is reduced by a specified amount, then a controlled amount of resins is removed, with the result that a smaller quantity of resins than originally cast solidifies and thus the ratio for resins present in the end product is smaller than that for resins contained in the initial casting.

If is also possible with the present invention to process the surface of the molded product to expose the fine particles on the surface.

The method to do this may be the selective removal method, which is applied to resins. More specifically, the surface is processed with an organic solvent to remove resins after softening or melting.

The organic solvent to be used is selected according to the resins in use. Available solvents include ethylene chloride, methylene chloride, chloroform and other halogenated hydrocarbons, acetic anhydride, ethyl acetate, butyl acetate and other carboxylic acids and their esters, acetone, tetrahydrofuran, DMF, and DMSO.

The molded product is immersed in an organic solvent or an organic solvent is sprayed or dripped on to the molded product to soften or melt the resins to remove them from the surface, eventually to roughen the surface.

Another alternative method to generate an uneven surface is to scrape the resins off the surface of the product with a wire brush, cutting means or the like.

Artificial stone of fine grain and sense of mass is produced with this processing method.

It is also effective with the artificial stone of the present invention to apply water jet to the surface of the product to introduce natural color tone or to give the sense of high class to the product.

In this case as well, the resins are removed off the surface to expose the fine particles. Application of water jet to the surface is an effective method therefor. This is a method to cut or impact a subject using hydraulic pressure. In this instance, approximately 1500 kgf/cm$^2$ or below is sufficient to attain the purpose. An excellent surface is obtainable with a lower pressure. To expose a flat surface, for example, water jet with a pressure approximately 500 to 1500 kgf/cm$^2$ is applied from a nozzle approximately 4 to 7 cm high from the surface.

Cylindrical artificial stone can be produced according to a known centrifugal molding method where prepared materials of the present invention as described above are input into a hollow cylindrical mold which is rotating via rollers, etc., and solidify in and conforms to the shape of the inner surface of said mold. The speed is selected adequately. High density cylindrical artificial stone with fine grain is produced by this centrifugal molding method.

It is also possible, in this instance, to input concrete for integration by centrifugal molding or before solidification, after the prepared material has solidified and is cured.

Because of the above possibility, the end product may also be used as stone pillars and other structural materials thereby enlarging the application range.

To product cylindrical artificial stone, very fine inorganic particles and resins are preferably mixed beforehand, and the resultant consistent mixture and the other inorganic fine particles are separately input into a rotating cylindrical mold for centrifugal molding and solidification. In this instance, said consistent mixture is preferably first input followed by inorganic fine particles which are put above the consistent mixture for centrifugal molding.

This embodiment is effective when inorganic fine particles, very fine particles and resins, and glass fiber where applicable, are difficult to be uniformly and efficiently spread over the surface of the mold by the centrifugal force (about 40 G) only.

According to prior art in such a case, a system in use is additionally pressurized from inside or the material is forcedly formed with a molding bar. The drawback of prior art in this instance is decreased productivity and operability.

The above embodiment enables production of uniform and quality cylindrical artificial stone without relying upon the use of the above mentioned conventional compulsive means.

Working examples are described below. It should be noted that the present invention is not limited to these working examples.

EXAMPLES 1

Natural quarts stones of particle size 10 to 25 mesh was uniformly mixed with calcium carbonates of 230 mesh to the weight ratio of 2 to 1 so that they jointly account to 90 wt % of the total fine mixture, together with 9 wt % polymethylmethacrylate resins and 1 wt % hardener to form mortar.

The mixture was input into a mold to produce a board about 15 mm thick.

The board was then immersed in a solvent which was a mixture of methylene chloride and ethylene chloride in order to soften the surface, remove the resins and expose the fine particles.

The resultant artificial stone was perfectly milky white and lustrous like natural marble. No bubbles were present inside and outside and the structure was uniform.

Specific gravity of the obtained artificial stone was 2.30, tensile strength 122 kg/cm$^2$, compression strength 605 kg/cm$^2$, bending strength 640 kg/cm$^2$, and the stone looked like natural marble. Quarts-base fine particles were exposed on the surface.

The obtained product as actually used as wall panels in a building to find that a beautiful marble wall full of sense of depth was produced.

EXAMPLE 2

The sum of fine and very fine particles was set at 93% in Example 1. The resins were softened with a mixed glacial acetic acid and ethyl acetate solvent to scrape them off with a wire brush.

Quality artificial stone similar to that produced in Example 1 was produced. Tensile strength of the derived artificial stone was 130 kg/cm$^2$, compression strength 605 kg/cm$^2$, bending strength 660 kg/cm$^2$, and the stone has an excellent surface with the sense of depth of marble.

EXAMPLE 3

Water jet with 800 kgf/cm² hydraulic pressure was applied to the surface form a nozzle 5 cm above the surface in example 1. A uniform and flat surface was produced. Quality artificial stone with excellent beauty was produced.

EXAMPLE 4

Glass fiber (30 μm in average diameter, 2 mm in length) of approximately 5 wt % of the fine particles was mixed in Example 1 to make artificial stone. Artificial stone of high strength and sense of depth with tensile strength 220 kg/cm², compression strength 610 kg/cm² and bending strength 750 kg/cm² was obtained.

EXAMPLE 5

Natural quarts stone of particle size 15 to 30 mesh was uniformly mixed with calcium carbonate of 230 mesh to the ratio of 2 to 1 by weight so that they jointly account for 90 wt % of the total mixture which contained 9 wt % of polymethylmethacrylate resins and 1 wt % of hardener to form mortar.

The mixture was input into a hollow rotary mold having 300 mm diameter to mold a hollow cylindrical material layer about 40 mm thick.

The layer was then cured in a curing room for more than five hours at 80° C., and then left undisturbed for about 10 hours. The surface was polished after the product was released from the mold.

The resultant cylindrical artificial stone was perfectly milky white and lustrous like natural marble. No bubbles were present inside and outside and the structure exposed on each surface was uniform.

Specific gravity of the produced artificial stone was 2.20, tensile strength 120 kg/cm², compression strength 600 kg/cm², and bending strength 640 kg/cm². The stone looked like natural marble. Quarts-base fine particles were exposed on the polished surface.

The product was actually used as pillars in a building to find that a beautiful marble-like pillar was produced.

EXAMPLE 6

The prepared mixture was 10 mm, and concrete was input to mold a product about 15 mm thick in Example 1.

Like in Example 1, artificial stone useful as pillars was produced. Tensile strength of the produced artificial stone was 130 kg/cm², compression strength 605 kg/cm², and the bending strength 660 kg/cm². The stone had an excellent marble-like surface.

EXAMPLE 7

In Working Example 5, calcium carbonate and polymethyl methacrylate resins were mixed beforehand to make a consistent mixture. The mixture was input into the mold and then natural quarts stone was input.

The resultant artificial stone showed excellent characteristics of tensile strength 180 kg/cm², compression strength 680 kg/cm², and bending strength 670 kg/cm².

The present invention provides high density artificial stone containing high density particles derived from natural stone which has never been produced with a conventional method and the production method therefor. The products produced according to the present invention are similar to natural stone in appearance and properties, and further, uniform products are produced in quantity, which is difficult to occur in the natural world. Further, such excellent products are produced without using specially expensive equipment.

High density artificial stone according to the present invention is most suitable for producing marble-like stone, and can be used in the same way as natural stone.

The product has the same color tone, lust in particularly, as that of polished natural stone, and can be used as a high class wall, floor, pillar material and the like in a wider application range than natural products.

Artificial marble, which has conventionally been a mere marble-looking product, is now no inferior to natural marble in the practical use, is easier to use than before, and has a number of merits as an artificial product.

I claim:

1. High density artificial stone consisting essentially of acrylic or methacrylic resins and 10 to 70 mesh inorganic fine particles and inorganic very fine particles of 100 mesh or above mixed to a ratio ranging from 0.5:1 to 5:1 by weight, which particles jointly account for at least 85 wt % of the final product, and wherein said particles are exposed on the surface of the final product.

2. The high density artificial stone of claim 1 having a polished or roughened surface.

3. High density artificial stone consisting essentially of acrylic or methacrylic resins and 10 to 70 mesh inorganic fine particles and inorganic very fine particles of 100 mesh or above mixed to a ratio ranging from 0.5:1 to 5:1 by weight, jointly accounting for at least 85 wt % of the final product and which also contains glass fibers equivalent to 1 to 15 wt % of the inorganic fine particles, and wherein said particles are exposed on the surface of the final product.

4. The high density artificial stone of claim 3 having a polished or rough surface.

5. The high density artificial stone of claim 1 wherein the inorganic fine particles having a 10 to 70 mesh are selected from the group consisting of stone, ceramics and glass and wherein the inorganic fine particles having a mesh of 100 or above are selected from the group consisting of calcium carbonate and aluminum oxide.

6. The high density artificial stone of claim 3 wherein the inorganic fine particles having a 10 to 70 mesh are selected from the group consisting of stone, ceramics and glass and wherein the inorganic fine particles having a mesh of 100 or above are selected from the group consisting of calcium carbonate and aluminum oxide.

7. The high density artificial stone of claim 1 wherein the inorganic fine particles jointly account for at least 90% of the final product.

8. The high density artificial stone of claim 3 wherein the inorganic fine particles jointly account for at least 90% of the final product.

9. The high density artificial stone of claim 5 wherein the inorganic fine particles jointly account for at least 90% of the final product.

10. A method of producing high density artificial stone by preparing a mixture of acrylic or methacrylic resins and 10 to 70 mesh inorganic fine particles and inorganic very fine particles of 100 mesh or above mixed to a ratio ranging from 0.5:1 to 5:1 by weight, jointly accounting for at least 85 wt % of the final product, placing said mixture into a mold for forming and removing the resins on the surface of the molded product by softening or melting said product in an organic solvent, or mechanically, in order to allow the particles to be exposed on the surface of the molded product.

11. The method of claim 10, wherein the inorganic fine particles having a 10 to 70 mesh are selected from the group consisting of stone, ceramics and glass and wherein the inorganic fine particles having a mesh of 100 or above are selected from the group consisting of calcium carbonate and aluminum oxide.

12. The method of claim 10 wherein the inorganic fine particles jointly account for at least 90% of the final product.

13. The method of claim 11 wherein the inorganic fine particles jointly account for at least 90% of the final product.

14. A method of producing a high density artificial stone by preparing an acrylic or methacrylic mixture of resins and 10 to 70 mesh inorganic fine particles and inorganic very fine particles of 100 mesh or above mixed to a ratio ranging from 0.5:1 to 5:1 by weight, jointly accounting for at least 85 wt % of the final product, placing said mixture into a mold for molding, and exposing the particles on the surface of the molded product by applying a water jet to the surface of said molded product.

15. The method of claim 14, wherein the inorganic fine particles having a 10 to 70 mesh are selected from the group consisting of stone, ceramics and glass and wherein the inorganic fine particles having a mesh of 100 or above are selected from the group consisting of calcium carbonate and aluminum oxide.

16. The method of claim 14 wherein the inorganic fine particles jointly account for at least 90% of the final product.

17. High density cylindrical artificial stone consisting essentially of acrylic or methacrylic resins and 10 to 70 mesh inorganic fine particles inorganic very fine particles of 100 mesh or above mixed to a ratio ranging from 0.5:1 to 5:1 by weight, jointly accounting for at least 85 wt % of the final product, said mixture being molded and solidified in a cylindrical form, wherein the end product has a polished or roughened surface.

18. The high density cylindrical artificial stone wherein the artificial stone of claim 17 is integrated into a cylindrical concrete molded product by solidification.

19. The high density cylindrical artificial stone of claim 17 which is molded and solidified into a cylindrical form.

20. The high density cylindrical artificial stone of claim 17 wherein glass fiber equivalent to 1 to 15 wt % of said inorganic fine particles is mixed therewith.

21. The method of producing the high density cylindrical artificial stone of claim 10 wherein the mixture is solidified by centrifugal molding and is cured followed by placing concrete inside the molded product for integrated solidification by centrifugal molding.

22. The method of producing the high density cylindrical artificial stone of claim 18 wherein concrete is placed into the prepared material for molding before said material solidifies at the time of centrifugal molding for integral solidification.

23. The high density artificial stone of claim 22 wherein the inorganic fine particles having a 10 to 70 mesh are selected from the group consisting of stone, ceramics and glass and wherein the inorganic fine particles having a mesh of 100 or above are selected from the group consisting of calcium carbonate and aluminum oxide.

24. The high density artificial stone of claim 17 wherein the inorganic fine particles jointly account for at least 90% of the final product.

25. A method of producing high density cylindrical artificial stone which comprises preparing a mixture of acrylic or methacrylic resins and 10 to 70 mesh inorganic fine particles and inorganic very fine particles of 100 mesh or above mixed to a ratio ranging from 0.5:1 to 5:1 by weight, jointly accounting for at least 85 wt % of the final product, placing the resultant mixture into a rotating cylindrical molding box for centrifugal molding and solidification to produce a molded product, followed by polishing or roughening the surface of the molded product.

26. The method according to claim 25 wherein glass fibers equivalent to 1 to 15 wt % of said inorganic fine particles are included in said mixture.

27. The method of claim 25 wherein the surface is roughened by water jet.

28. The method of producing the high density cylindrical artificial stone of claim 25 wherein a pre-mixed consistent mixture consisting of inorganic very fine particles and resins and the inorganic fine particles are separately placed into a rotating cylindrical molding box for centrifugal molding and solidification.

29. The method of claim 28 wherein the pre-mixed consistent mixture of inorganic very fine particles and resins is first placed into the mold followed by placing inorganic fine particles thereupon for simultaneous centrifugal molding.

30. The method of claim 28 wherein glass fibers are included in said consistent mixture.

31. The method of claim 25, wherein the inorganic fine particles having a 10 to 70 mesh are selected from the group consisting of stone, ceramics and glass and wherein the inorganic fine particles having a mesh of 100 or above are selected from the group consisting of calcium carbonate and aluminum oxide.

32. The method of claim 25 wherein the inorganic fine particles jointly account for at least 90% of the final product.

* * * * *